(12) United States Patent
Tsubata et al.

(10) Patent No.: US 6,189,412 B1
(45) Date of Patent: Feb. 20, 2001

(54) VEHICULAR TRANSMISSION

(75) Inventors: Yoshimichi Tsubata; Shuji Kuroda; Eiji Ohyama; Eiji Suzuki; Hiroyuki Kita; Tomoaki Ishikawa, all of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/359,132

(22) Filed: Jul. 23, 1999

(30) Foreign Application Priority Data

Jul. 24, 1998 (JP) .................................................. 10-208928

(51) Int. Cl.[7] .................................................. F16H 57/04
(52) U.S. Cl. .......................................... 74/606 R; 474/43
(58) Field of Search .................................. 74/606 R, 467; 474/43

(56) References Cited

U.S. PATENT DOCUMENTS 4,990,126 * 2/1991 Ideta et al. ..................... 74/606 R X

FOREIGN PATENT DOCUMENTS 4-258528   9/1992 (JP) .

* cited by examiner

Primary Examiner—Mary Ann Green
(74) Attorney, Agent, or Firm—Armstrong, Westerman, Hattori, McLeland & Naughton

(57) ABSTRACT

A housing 2 for a vehicular transmission comprises a first room R1 which accommodates a continuous speed change mechanism and a second room R2 which accommodates a driving force transmission mechanism including a starting mechanism, a reduction train, a differential mechanism, a power supply mechanism for an oil pump, etc. In each room, inlet openings 72 through 74 for oil discharge passages are provided near and above both the sides of an oil pan 26 in the horizontal direction perpendicular to the input and output shafts of the continuous speed change mechanism, to return lubrication oil to the oil pan 26. Also, walls 61 through 65 are provided in the rooms to lead the lubrication oil into the respective inlet openings. In this construction, the lubrication oil returning from each room to the oil pan 26 is stabilized at each room and discharged to the oil pan 26, and thereby the lubrication oil achieves homogeneity in the oil pan 26.

9 Claims, 9 Drawing Sheets

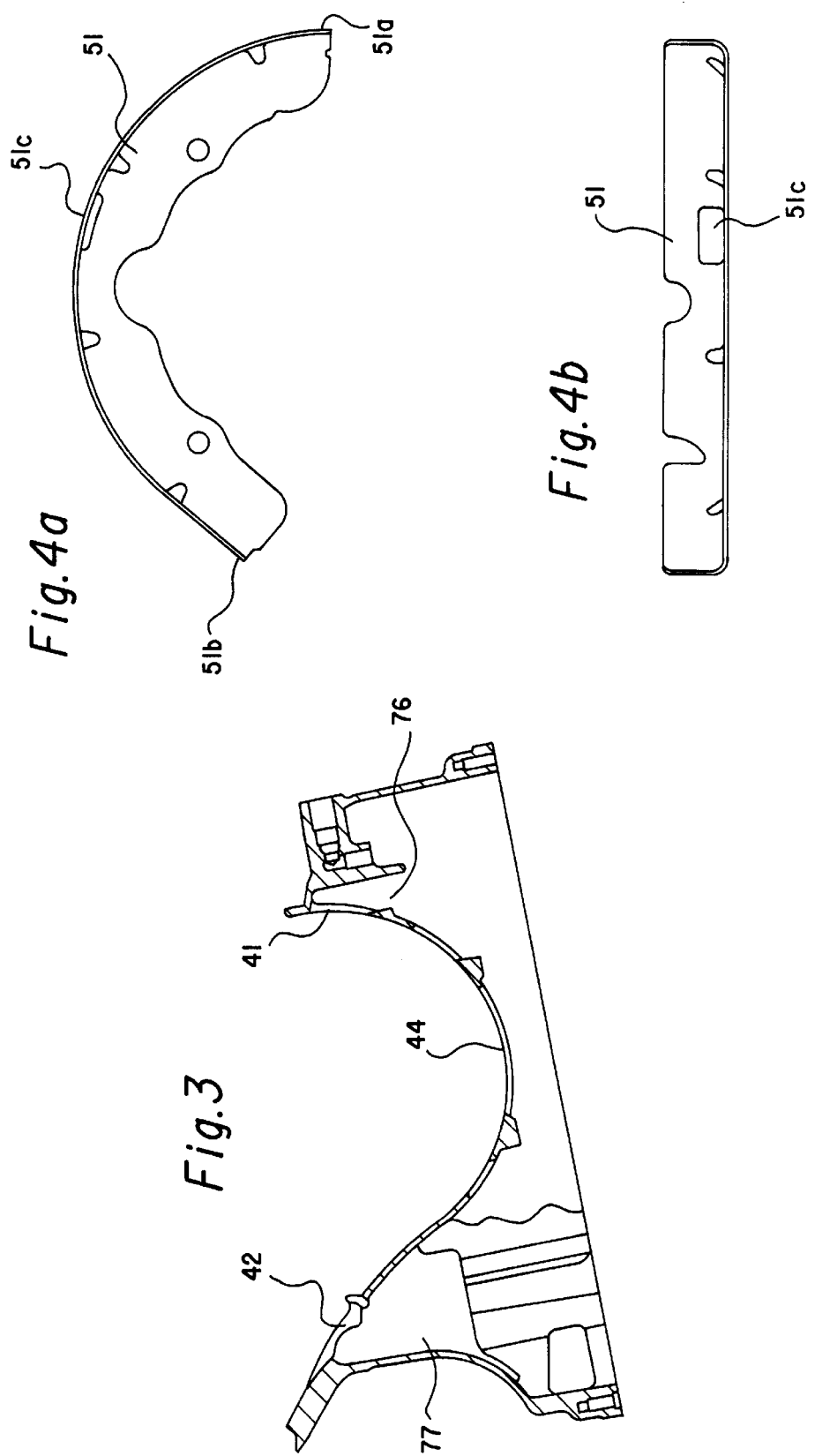

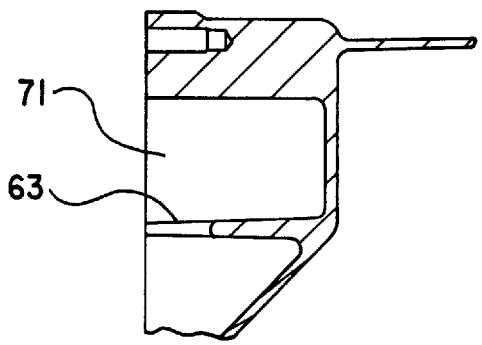
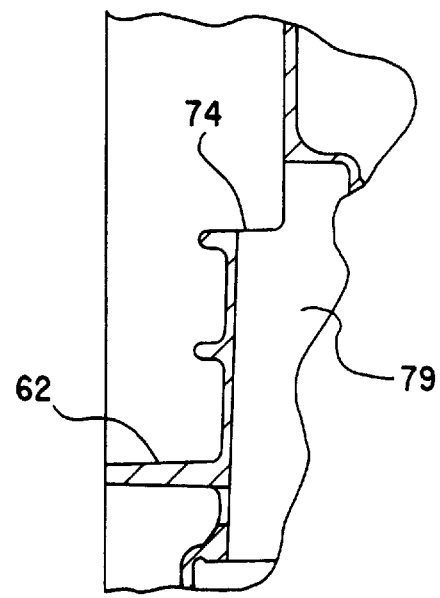
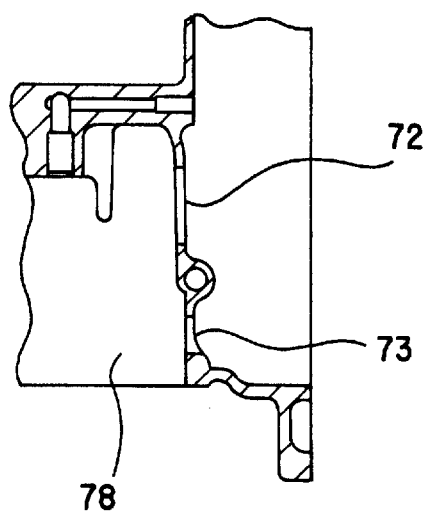

VEHICULAR TRANSMISSION

FIELD OF THE INVENTION

The present invention relates generally to a transmission which is used on a vehicle, and particularly to the configuration of a housing (i.e., a transmission case) used for a belt-type continuously variable transmission which comprises a pair of pulleys and a belt disposed around these pulleys.

BACKGROUND OF THE INVENTION

Power transmissions which transmit power by a belt disposed around a pair of pulleys have been well-known and are widely used. As such a transmission, a belt-type continuously variable transmission comprises a pair of pulleys, each pulley having a variable groove width, and a belt disposed therearound. The V-belt pitch radii of the pulleys are variably changed by adjusting the groove widths of the pulleys, so that the speed ratio of the transmission is continuously varied. It has been known that this type of transmission can be used on a vehicle as disclosed in Japanese Laid-Open Patent Publication No. H4(1992)-258528, which was filed by the same applicant as for this application.

This vehicular continuously variable transmission comprises a drive and driven pulleys, a belt, a forward-reverse selector mechanism, a starting mechanism, a reduction train, a differential mechanism, etc. in a hosing, and for lubricating these mechanisms, forced-feed lubrication or sprinkled lubrication by gear rotation is carried out. The oil used for this lubrication is also used as a hydraulic pressure controlling fluid (hydraulic oil) for controlling the adjustment of the groove widths of the drive and driven pulleys and for controlling a clutch.

The hydraulic pressure which is used for the forced-feed lubrication and for the hydraulic control is generated by a hydraulic pump which is driven by an engine through a gear or a chain mounted on a shaft that is coupled to the engine, and the hydraulic pressure is delivered to the components which require lubrication and to the components which require hydraulic pressure control. After the hydraulic pressure is used for the respective purposes, the hydraulic oil flows downward from the respective components. Therefore, the transmission includes an oil well or an oil pan to collect the hydraulic oil, which is then recirculated by the hydraulic pump.

In this vehicular transmission, the hydraulic oil, which has been used for forced-feed lubrication and hydraulic pressure control, flows on and along the inner surface of the housing, which accommodates the continuous speed change mechanism, the starting mechanism, the reduction train, the differential mechanism, etc. of the transmission, and the oil flows through an opening which is provided in the lower portion of the housing, to the oil pan. In the housing, the space for accommodating each mechanism is partitioned with a cover, or the wall of the housing is configured to partition the accommodation space for each mechanism. In this case, an independent oil outlet is provided in the accommodation space partitioned for each mechanism.

However, in this construction of the continuously variable transmission, the position of each mechanism, i.e., the above mentioned continuous speed change mechanism, the starting mechanism, the reduction train, the differential mechanism, etc. in the housing is not arranged evenly equidistant with respect to the oil pan, and the lubrication oil, after being used, comes out of the rooms which are partitioned for the respective mechanisms in different amounts. Therefore, the hydraulic oil returning from each mechanism to the oil pan joins in the way back and forms a complicated flow in the housing, which may tend to produce bubbles and vortices in the hydraulic oil in the oil pan. As a result, the lubrication oil which is sucked from the oil pan into the oil pump may include mingled air, which may cause a shortage in the real amount of lubrication oil that is supplied to each mechanism and a decline of the pressure that is needed for proper lubrication. Also, the oil may acquire a high temperature, which renders the oil to lose viscosity and less effective as a lubricant.

SUMMARY OF THE INVENTION

It is an object of the present invention to equalize the flow of lubrication oil in a continuously variable transmission in the direction which is perpendicular to the input and output shafts of a continuous speed change mechanism.

It is another object of the present invention to stabilize the flow of lubrication oil returning to an oil pan in a continuously variable transmission.

It is yet another object of the present invention to eliminate bubbling of lubrication oil in an oil pan in a continuously variable transmission.

In order to achieve these objectives, the present invention provides a vehicular transmission which comprises a continuous speed change mechanism, a driving force transmission mechanism, a housing and an oil pan. The continuous speed change mechanism includes a drive pulley which is disposed on an input shaft, a driven pulley which is disposed on an output shaft, and a belt which is disposed around these pulleys for torque transmission. The housing accommodates the continuous speed change mechanism and the driving force transmission mechanism which includes a starting mechanism (also, a reduction train, a differential mechanism, a power transmission mechanism for an oil pump, etc.), and the oil pan is disposed at the lower part of the housing. The housing comprises a first room which accommodates the continuous speed change mechanism and a second room which accommodates the driving force transmission mechanism including the starting mechanism, and the first and second rooms are positioned above the oil pan. In the housing, at least one oil discharge passage is provided for each side of the oil pan in the horizontal direction perpendicular to the input and output shafts, and each oil discharge passage is positioned near and above the oil pan and used for returning the hydraulic oil (or lubrication oil) from each of the mechanisms in the first and second rooms to the oil pan. Furthermore, at least one inlet opening is provided for each of the oil discharge passages, and these inlet openings are positioned in the horizontal direction in the inner walls of the first and second rooms near and above both the sides of the oil pan.

This type of belt-type continuously variable transmission, which comprises a belt-type continuous speed change mechanism including a drive pulley, a driven pulley and a belt is very likely to lose transmission efficiency if the lubrication oil becomes short. Therefore, necessary lubrication must be maintained while preventing the flow of the lubrication oil from becoming a rotational resistance (or friction). By making the first room accommodating the continuous speed change mechanism as an independent room as described above, the necessary lubrication of the continuous speed change mechanism is carried out sufficiently while reducing the rotational resistance to a minimum.

The driving force transmission mechanism, which includes the starting mechanism, the reduction train, the differential mechanism, etc., is a mechanism which requires the output of the continuous speed change mechanism, and it includes gears and clutches. In the present invention, the driving force transmission mechanism is placed in the second room as a unit, so the system for the lubrication of the gears, the clutches, etc. is efficient. Furthermore, in the housing, at least one oil discharge passage is provided for each side of the oil pan in the horizontal direction perpendicular to the input and output shafts of the continuous speed change mechanism to return the hydraulic oil which is used for the control and lubrication of the mechanisms in the first and second rooms. These oil discharge passages are positioned near and above both the sides of the oil pan, which is partitioned by the walls of the housing with respect to the first and second rooms. In this construction, the lubrication oil returning from each room to the oil pan becomes an independent flow, so the flow of the lubrication oil is smooth without any deviation. As a result, vortex motion which may occur in the flowing oil is restricted in the oil pan, and a substantially uniform temperature is achieved for the oil in the oil pan.

In this continuously variable transmission, it is preferable that additional oil passages be provided to lead the lubrication oil into the inlet openings of the oil discharge passages in the housing. By providing such oil passages, the hydraulic oil flowing out of each mechanism can be divided into two flows, each flow being led into one of the sides of the oil pan, respectively, and the amount of the lubrication oil flowing through the inlet openings and the oil discharge passages to the oil pan can be balanced with each other. If the lubrication oil from each of the first and second rooms is divided equally between both the sides of the oil pan, then the mixing of the flow of the lubrication oil is rectified. As a result, vortex motion which may occur in the flow of the oil is restricted in the oil pan, and the oil acquires a substantially uniform temperature in the oil pan. Such oil passages can be formed in a one body with the housing. Since the lubrication oil scattered by the rotating components of the transmission in the housing hits the inner walls of the housing and flows down along the inner walls, for example, walls (or ribs) which can constitute oil passages can be formed when the housing is molded (e.g., as an aluminum casting).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein:

FIG. 3 is a partial cross-sectional view of the housing;

FIGS. 4a and 4b are a front view and a side view, respectively, of a cover, which is installed in the pulley chamber;

FIG. 7 is a cross-sectional view showing an oil passage in the second room;

FIG. 8 is a partial cross-sectional view showing an oil discharge passage and its opening which is located at the upper part of one side (referred to as "portion to the front of a vehicle") of an oil pan in the second room;

FIG. 9 is a partial cross-sectional view showing an oil discharge passage and its opening which is located at the upper part of another side (referred to as "portion to the rear of a vehicl") of the oil pan in the second room;

DESCRIPTION OF THE PREFERRED EMBODIMENTS

Figure 10:
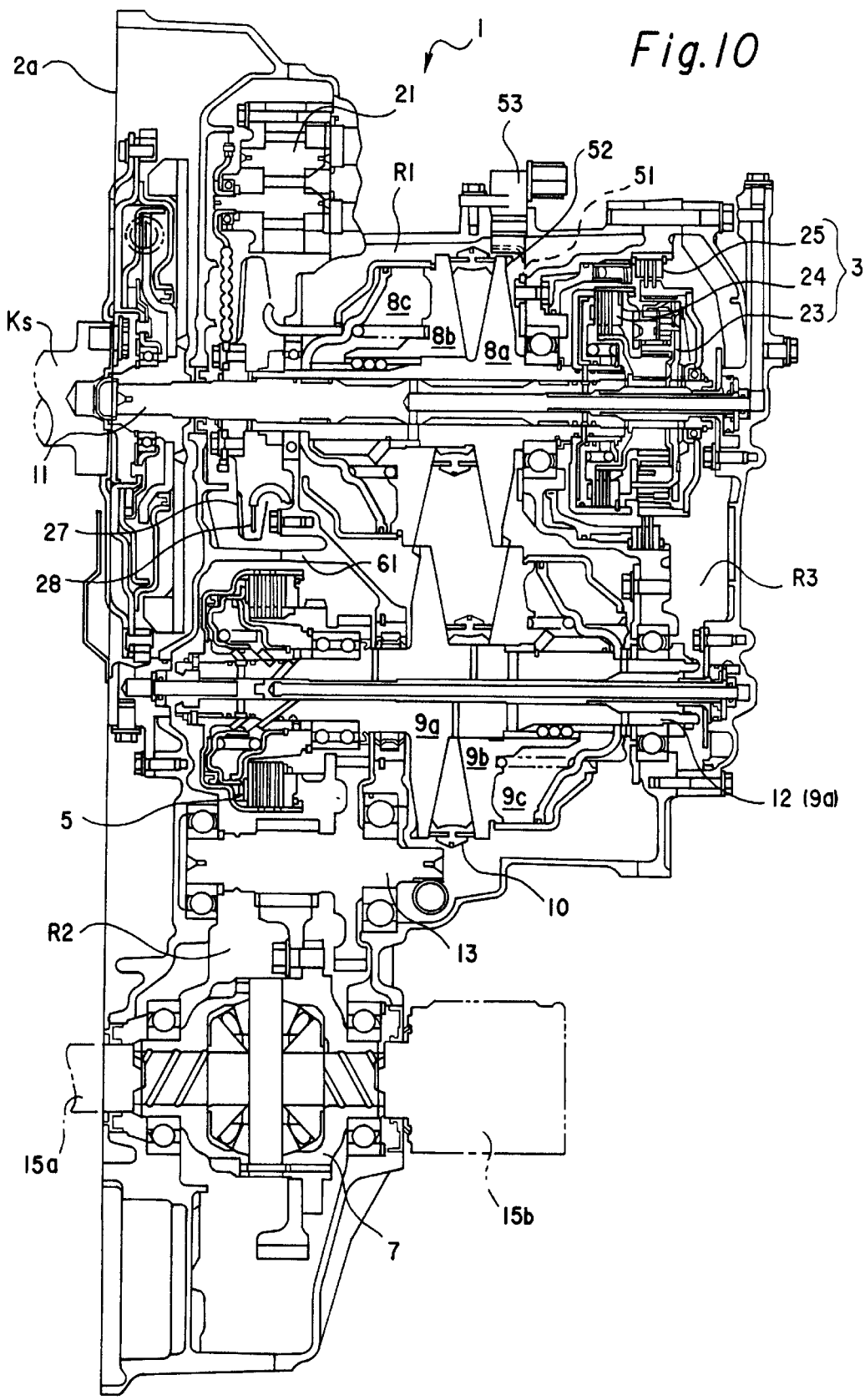
FIG. 10 is an illustrative drawing showing the construction of the vehicular transmission according to the present invention.
Figure 11:
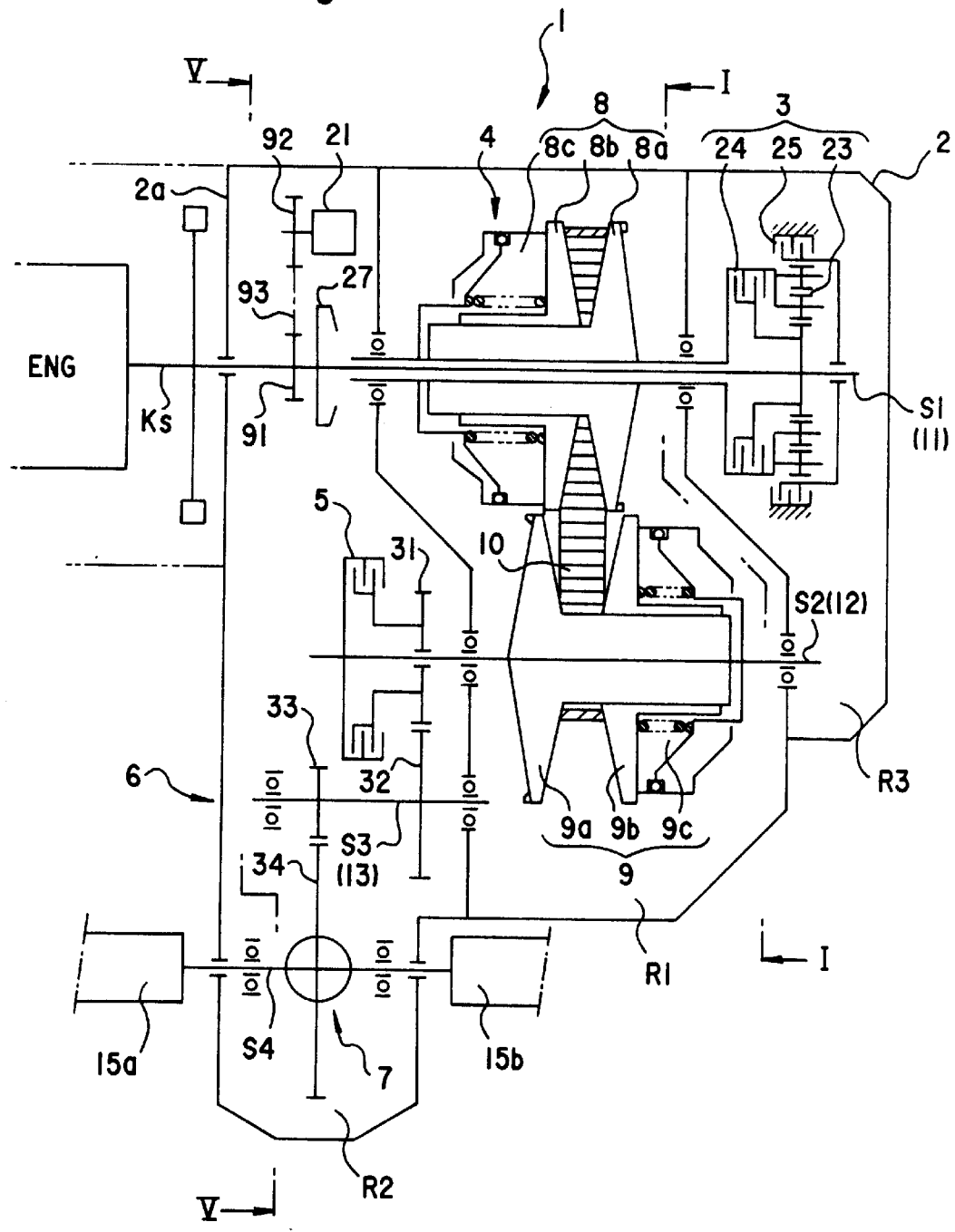
FIG. 11 is a schematic diagram showing the construction of the vehicular transmission.

FIGS. 10 and 11 show the construction of a belt- type continuously variable transmission 1. This belt-typecontinuously variable transmission 1 comprises a forward-reverse selector mechanism 3, a belt-typecontinuous speed change mechanism 4, a starting mechanism 5 (i.e., a starting clutch), a reduction train 6 (a train of gears 31 through 34), a differential mechanism 7, a power supply mechanism (including sprockets 91 and 92 and a chain 93) for transmitting power to an oil pump provided in a transmission housing 2, which is attached to an engine at an abutment surface 2a. The crank shaft Ks of the engine is coupled to a drive plate of a flying wheel which drives the input shaft 11 (also referred to as "first shaft") of the transmission according to the present invention.

The driving force from the engine is transmitted from the first shaft S1 (including the input shaft 11 of the transmission) through a second shaft S2 (including the output shaft 12 of the transmission) and through each of the above mentioned mechanisms to a fourth shaft S4, which drives the axles 15a and 15b of a vehicle. The housing of the transmission comprises a first room R1, which accommodates the belt-typecontinuous speed change mechanism 4, a second room R2, which accommodates the starting mechanism 5, the reduction train 6, the differential mechanism 7, etc., and a third room R3, which accommodates the forward-reverse selector mechanism 3.

In this belt-typecontinuously variable transmission, a drive pulley 8 is provided for the belt-typecontinuous speed change mechanism 4 on the first shaft S1 in the first room R1, and the forward-reverse selector mechanism 3 is arranged in the third room R3. The crank shaft Ks of the engine is coupled to the input shaft 11 in the first shaft S1, and the input shaft 11 is connected to the forward-reverse selector mechanism 3 through the drive pulley 8, whose central part is hollow.

The forward-reverse selector mechanism 3 comprises a double pinion type planetary gear 23 and includes a forward drive clutch 24, which directly connects the input shaft 11 to the drive pulley 8, and a rearward drive brake 25, which is capable of holding the ring gear stationary. When these forward drive clutch 24 and rearward drive brake 25 are selectively activated, the drive pulley 8 is rotated clockwise or counter-clockwise with respect to the input shaft 11.

The drive pulley 8 comprises a stationary pulley half 8a, a movable pulley half 8b, which is movable with respect to the stationary pulley half 8a over the spindle of and in the axial direction of the stationary pulley half 8a. The drive pulley 8 further comprises a cylinder chamber 8c, which is provided on the outside of the movable pulley half 8b to move the movable pulley half 8b in the axial direction by the hydraulic pressure supplied thereinto.

The hydraulic pressure which drives the movable pulley half 8b is supplied through an oil passage which is formed in the input shaft 11 and through an oil passage provided in the stationary pulley half 8a into the cylinder chamber 8c. By controlling this hydraulic pressure (referred to as "pulley thrust pressure"), the position of the movable pulley half 8b, i.e., the width of the V groove of the drive pulley 8, is adjusted. From this oil passage which passes through the input shaft 11, additional oil passages are provided between the input shaft 11 and the stationary pulley half 8a, both of which rotate together, and also between the stationary pulley half 8a and the movable pulley half 8b, and to the planetary gear 23 and to the forward drive clutch 24, and the lubrication oil is supplied to carry out the lubrication of these components at the same time.

In the first room R1, the driven pulley 9 of the belt-type continuous speed change mechanism 4 is provided on the second shaft S2 (including the output shaft 12), which extends in parallel with and at a predetermined distance from the first shaft S1. The starting clutch 5 and the first gear 31 of the reduction train 6 are provided rotatably in the second room R2. The output shaft 12 in the second shaft S2 is formed in a one body with the stationary pulley half 9a of the driven pulley 9, and the driven pulley 9 further comprises a movable pulley half 9b, which is movable with respect to the stationary pulley half 9a over the spindle of and in the axial direction of the stationary pulley half 9a, and a cylinder chamber 9c is provided on the outside of the movable pulley half 9b to move the movable pulley half 9b in the axial direction by the hydraulic pressure supplied thereinto.

The hydraulic pressure which drives the movable pulley half 9b is supplied through an oil passage which is formed in the output shaft 12 into the cylinder chamber 9c. The hydraulic pressure supplied into the cylinder chamber 9c is predetermined in consideration of the basic characteristics of the transmission, such as the transmission torque. In the output shaft 12, oil passages for supplying the lubrication oil are provided between the stationary pulley half 9a and the movable pulley half 9b, and to the starting clutch 5, to the secondary drive gear 31, and to the bearing portions which supports the output shaft 12 rotatably, and all these rotatable components of the transmission are lubricated together.

The belt-type continuous speed change mechanism 4 further comprises a belt 10, which is disposed around the drive pulley 8 and the driven pulley 9, and the rotation of the drive pulley 8 is transmitted to the driven pulley 9 through the belt 10. The control of the speed ratio is executed by changing the thrust pressure of the drive pulley 8 with respect to the pressure of the cylinder chamber 9c of the driven pulley 9, which pressure is kept at constant (this constant pressure is referred to as "line pressure").

Namely, when the hydraulic pressure supplied into the cylinder chamber 8c of the drive pulley 8 is increased, the groove width of the drive pulley 8 will become narrower, and the pitch radius of the drive pulley 8, around which the belt 10 is disposed, will become greater. As the length of the belt 10 is constant, the tension generated in the belt 10 will act to widen the groove width of the driven pulley 9, thereby making the pitch radius of the driven pulley 9 smaller. On the other hand, if the thrust pressure of the drive pulley 8 is decreased with respect to that of the driven pulley 9, then the opposite action is achieved. In this way, the relative thrust pressure difference between the hydraulic pressures which are supplied to the movable pulley halves of the drive and driven pulleys 8 and 9, respectively, is utilized to adjust the movable pulley halves 8b and 9b to achieve an appropriate relation in the groove widths and pitch radii of the drive and driven pulleys 8 and 9. Thus, the rotational speed ratio can be changed continuously between the drive and driven pulleys 8 and 9.

The oil pump 21, which is provided in the second room R2, is driven by the input shaft 11 through the sprocket 91, which is disposed on the input shaft 11, the sprocket 92, which is provided to the oil pump 21, and the chain 93, which is disposed around both the sprockets. The oil pump 21, through a suction oil passage, sucks the lubrication oil in an oil pan, which is provided at the lower portion of the transmission, through a strainer or filter, which is incorporated in the oil pump 21, for purification. The oil sucked and delivered by the oil pump 21 is used for the hydraulic pressure control, the lubrication, and the cooling of the transmission.

The first gear 31 is mounted over the output shaft 12 through the starting clutch 5 on the left side of the driven pulley 9. The starting clutch 5 is operated to control the transmission of the driving force. The second gear 32 and the third gear 33 are formed in a one body on a third shaft 13, which is positioned in the shaft S3. This shaft S3 is disposed in parallel with and at a predetermined distance from the second shaft S2, and the second gear 32 meshes with the first gear 31. In addition, the differential mechanism 7 is arranged on the fourth shaft S4, which is disposed in parallel with and at a predetermined distance away from the third shaft S3, and the fourth gear 34, which is coupled to the differential mechanism 7, meshes with the third gear 33.

These first through fourth gears (31, 32, 33 and 34) constitute the gear train which transmits the power, and the rotation of the driven pulley 9 is transmitted through this gear train to the differential mechanism 7. As the left and right axles 15a and 15b are connected to the differential mechanism 7, the power transmitted to the differential mechanism 7 is divided to the axles 15a and 15b, which rotate the right and left wheels (not shown).

Figure 1:
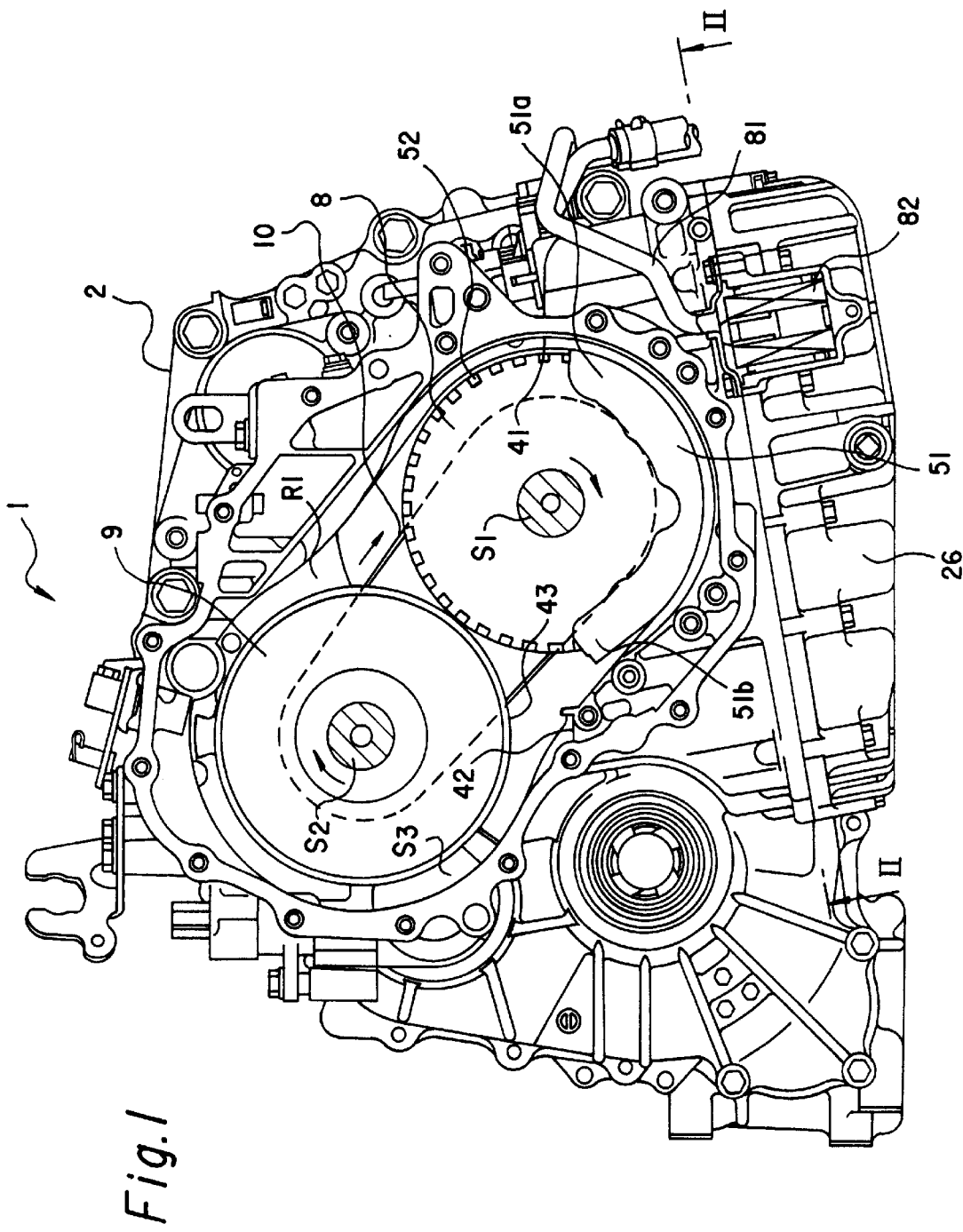
FIG. 1 is a cross-sectional view showing the inside of a first room (pulley chamber) of a vehicular transmission according to the present invention.

As shown in FIG. 1, the lower portion of the housing of this belt-typecontinuously variable transmission constructed for vehicular use as described above includes the oil pan 26, which collects the lubrication oil used for the lubrication and cooling of the transmission, and the oil pump 21, which recycles the oil collected in the oil pan 26 through a filter or a suction strainer. Moreover, part of the oil discharged from the oil pump 21 is cooled by an oil cooler and is returned laterally to the oil pan 26 through a return line 81 and a filter 82.

Figure 12:
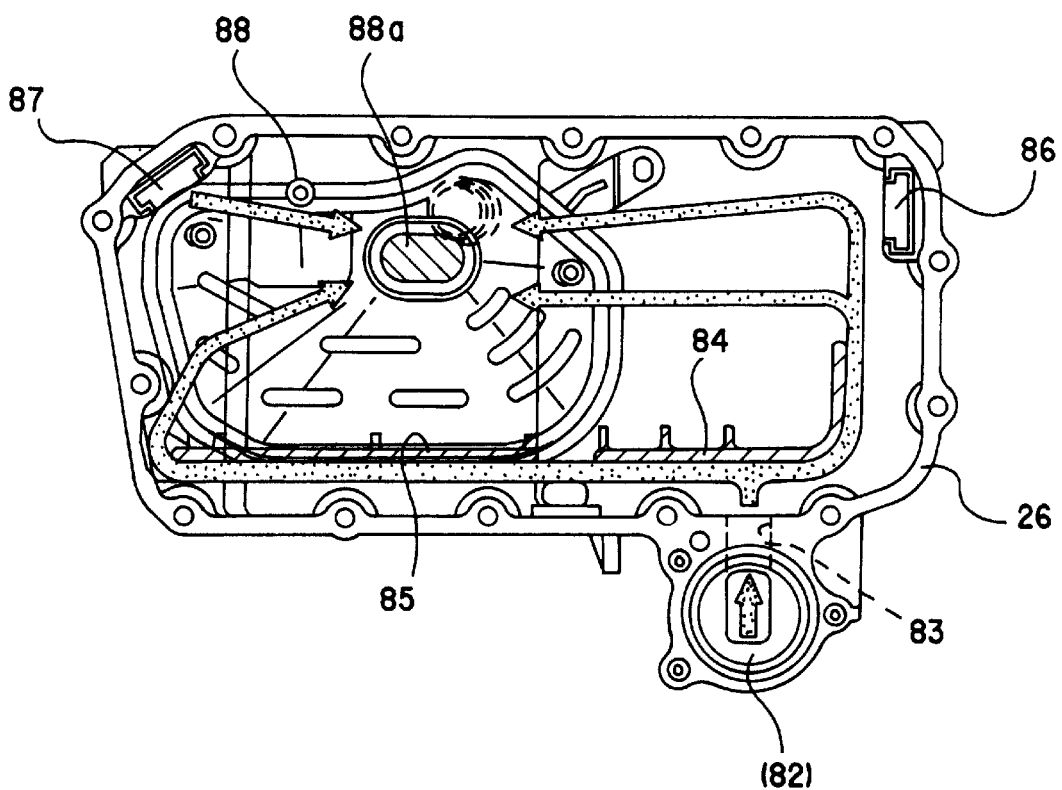
FIG. 12 is an illustrative drawing showing the inside of the oil pan of the vehicular transmission.

FIG. 12 shows the oil pan 26 as seen from the above. The oil pan 26 includes rectifying walls 84 and 85, which are indicated by hatching in the figure The lubrication oil returning through a return oil passage 83 from the below (indicated by numeral 82 in the figure) after being cooled by the oil cooler is directed by the rectifying walls 84 and 85 into two horizontal directions which are perpendicular to the input and output shafts of the continuous speed change mechanism. This flow of the oil is shown by bold arrows in the figure.

With this construction of the oil pan 26, the oil passage between the return oil passage 83 and the suction opening 88a of the suction strainer 88 of the oil pump 21 is made sufficiently long to eliminate bubbles in the oil before the oil reaches the suction opening 88a, and thereby suction of the air, which reduces the controllability of the hydraulic pressure, is prevented. In addition, the flow of the oil is directed toward magnets 86 and 87, which are provided in the inner wall of the oil pump 21 to remove metallic minute particles, and thereby the recovery rate of metallic particles that are mixed in the oil is increased. Moreover, as the oil, which is cooled substantially by the oil cooler, is directed into the above described two directions in the oil pan 26, occurrence of stagnation is prevented, and the polarization of the oil temperature is reduced. As a result, the controllability of the hydraulic pressure is improved.

FIG. 1 is a front view (a view seen in the direction indicated by arrows I—I in FIG. 11) of the continuous speed change mechanism of the vehicular transmission according to the present invention, and it shows the inside of the first room R1 (pulley chamber), which accommodates the drive pulley 8, the driven pulley 9, and the belt 10, which are shown also in FIG. 11. S1 through S4 in FIG. 1 correspond with S1 through S4 in FIG. 11. The power transmitted from the drive pulley 8 (i.e., the first shaft S1), which is shown in the lower right of FIG. 1, to the driven pulley 9 (i.e., the second shaft S2), which is shown in the upper center, is then transmitted through the second shaft S2, which extends through the wall of the pulley chamber R1, to the starting mechanism, which is located in the second room R2. Then, in the second room R2, the power is transmitted to the reduction train 6 (third shaft S3) and to the differential mechanism 7 (fourth shaft S4).

Under the lower portion of these rooms, i.e., the first and second rooms R1 and R2, the above described oil pan 26 is provided. In the figures referred in the following description, the identical numerals are used for the identical parts, and no further description is given of the parts which have been already explained in reference to FIGS. 10 and 11. The following description is based on the transmission being mounted on a vehicle unless otherwise specified, and the rotational direction of the drive pulley 8, the driven pulley 9 and the belt 10 is in the direction indicated by an arrow in the FIG. 1. In this embodiment, the front and rear direction of the vehicle is perpendicular to the input and output shaft of the continuously variable transmission (i.e., the engine is placed laterally). However, the present invention is not limited to this arrangement and is applicable to the arrangement where the engine is disposed longitudinally along the vehicle. To simplify the description, expressions "the front of the vehicle" or "the rear of the vehicle" is used to describe the direction. For example, the right side of the drawing of FIG. 1 in this embodiment is the front of the vehicle (i.e., the forward direction of the vehicle).

As described above in reference with FIG. 10, the lubrication oil to the drive pulley 8, which is mounted on the input shaft 11 (first shaft S1), and to the driven pulley 9, which is mounted on the output shaft 12 (second shaft S2), is supplied through the oil passages which pass through the center of the shafts, respectively, and it is sprayed radially outward in the direction which is perpendicular to the respective shafts by the centrifugal forces generated from the rotation of the respective pulleys and hits the inner wall of the pulley chamber R1. As for the driven pulley 9, which is shown at the upper left in the drawing, the lubrication oil is also sprayed in a large amount from the bottom of the V groove to the inner face of the belt 10.

Part of this lubrication oil is thrown radially over the V surface of the rotating driven pulley 9 by the centrifugal force and hits the inner wall of the pulley chamber R1 which is positioned perpendicular to the second shaft S2. The portion of the lubrication oil which stick to the belt 10 is carried by the belt, and most of it departs from the belt by its own inertia near and at an inflection point where the direction of the motion of the belt drastically changes from a straight line, which is formed by the belt extending between the pulleys, to an arc, which is formed by the belt disposed around the respective pulley. This portion of the lubrication oil is also thrown to the inner wall of the pulley chamber R1. To direct this portion of the oil, which is thrown from the belt, directly to the outside of the pulley chamber R1, an inlet opening 41 is provided for an oil discharge passage at the portion of the housing near the drive pulley 8, where an imaginary line extending from the straight portion of the belt passes through the wall of the housing. Moreover, another inlet opening 42 is provided at the portion of the inner wall facing upward of the pulley chamber R1 which wall portion is located equidistant to both the pulleys. This inlet opening is to lead the lubrication oil which flows down along the inner wall to the oil discharge passage which discharges the oil out of the pulley chamber R1.

Figure 2:
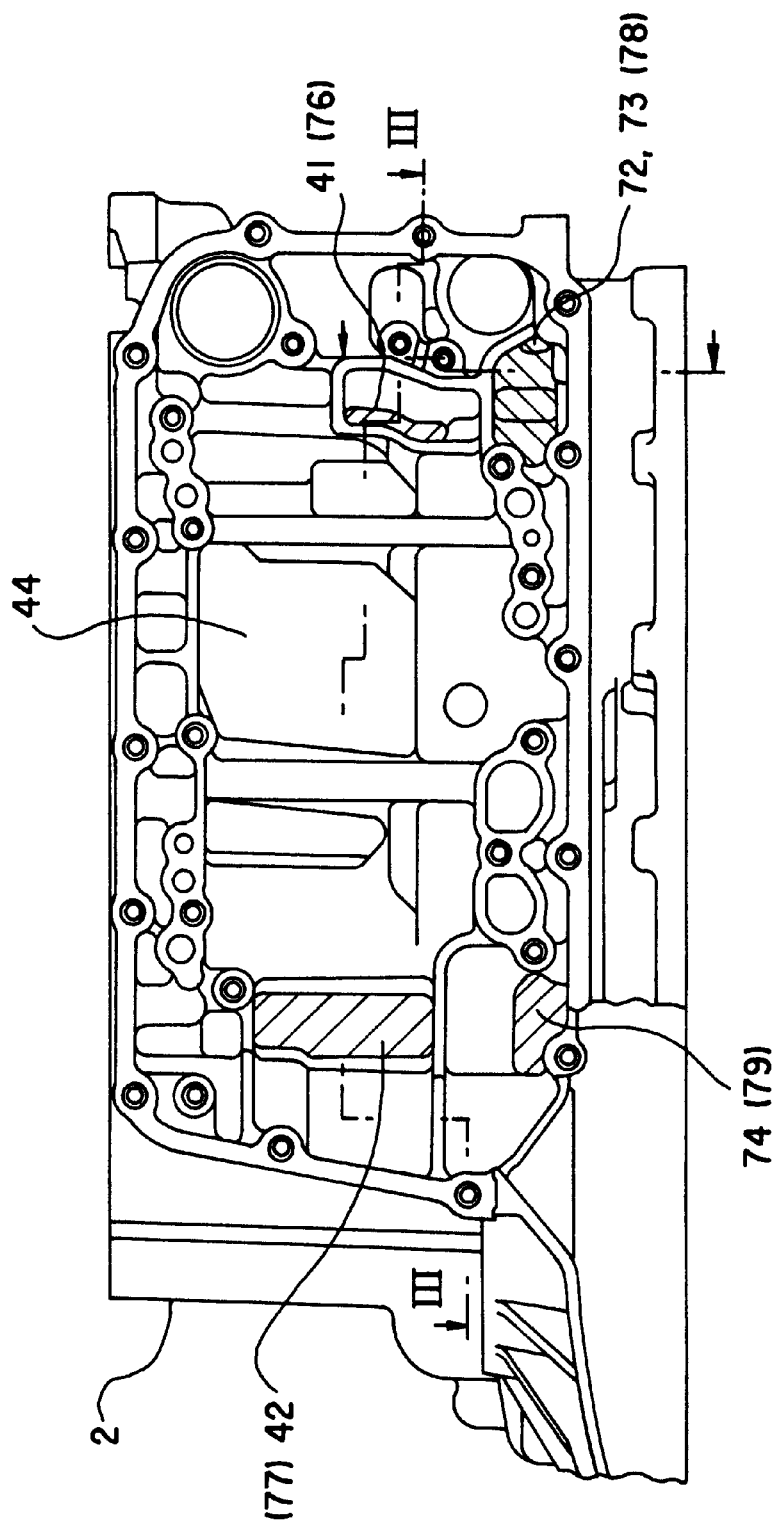
FIG. 2 is a cross-sectional view of the housing of the vehicular transmission, seen upward from the bottom.

Now, reference is made to FIGS. 2 and 3. FIG. 2 is a view seen in the direction indicated by arrows II—II in FIG. 1, i.e., a view of the housing seen from the bottom. To clarify the arrangement of the oil discharge passages, the inlet openings of the oil discharge passages are darkened in the drawing and are indicated by numerals, and the oil discharge passages are indicated by parenthetical numerals. FIG. 3 is a cross-sectional view of the housing seen in the direction indicated by arrows III—III in FIG. 2, and it shows the cross section taken by the plane which is perpendicular to the shafts of the pulleys and which passes through the middle point between the stationary pulley halves and the movable pulley halves of the two pulleys, to illustrate an oil discharge passage 76 located toward the front of the vehicle, an oil discharge passage 77 located toward the rear of the vehicle, and the inlet openings 41 and 42 of these oil discharge passages. These figures show that the oil discharge passages and their inlet openings are provided in the pulley chamber R1, on one side of and near and above the oil pan 26, toward the front and rear of the vehicle.

By the way, the direction of the motion of the lubrication oil which departs from the belt at the above mentioned inflection point, i.e., the point of the directional change of the belt movement from the straight portion to the arc portion, where the belt starts encircling the respective pulley, does not exactly match the above mentioned imaginary line extending from the straight portion of the belt. However, the oil departs from the belt in a direction which is somewhat radially inward from the direction of this imaginary extension line. The degree of this discrepancy depends on the viscosity of the lubrication oil, the rotational speed of the belt, and the pitch radii of the pulleys. In consideration of these factors, the position of the upper end of the inlet opening 41 of the oil discharge passage which is provided in the direction of the extension line is determined appropriately to meet the condition of over-drive where the pitch radius of the drive pulley is at the maximum while that of the driven pulley is at the minimum. Also, the position of the lower end of the inlet opening 41 is determined to meet the condition where the pitch radii of the respective pulleys are in the condition opposite to the above description. If the inlet opening determined this way is too long to threaten the strength of the housing, then a rib can be provided appropriately in the middle of the opening.

The width of the inlet opening 41 in the direction of the pulley shafts is determined equal to the maximum width of the V-shaped groove measured at the outer periphery of the drive pulley 8, which maximum width is attainable by moving the movable pulley half 8b as far as possible from the stationary pulley half 8a. As the width of the V-shaped groove of the pulley is greater or equal to the width of the belt, the width of the lubrication oil departing from the belt 10 is smaller than or equal to the width of the inlet opening 41. As the inlet opening 41 is formed with the width and the length which are determined as described above, most of the lubrication oil departing from the belt is received through the inlet opening into the oil discharge passage. Therefore, it is preferable that the width of this inlet opening be equal to or more than the width of the V-shaped groove at the outer periphery of the respective pulley.

The lubrication oil which is thrown radially from the V-shaped grooves of the drive and driven pulleys 8 and 9 by the respective centrifugal forces hits the inner wall of the pulley chamber R1 and then flows down along the inner wall by the gravitation. The part of the lubrication oil which hits the portion of the inner wall just above and the portion located on the right side of the drive pulley 8 in FIG. 1 flows down along the inner wall toward the lower right in the drawing and into the inlet opening 41 of the oil discharge passage which leads to the oil pan 26. Also, the lubrication oil which hits the portion of the inner wall of the pulley chamber R1 just above and the portion located on the left side of the driven pulley 9 flows down along the rounded portion of the inner wall located on the left side of the respective pulley. To discharge this lubrication oil, the inlet opening 42 is positioned at a midpoint between both the pulleys.

At the downstream side in the flow of the lubrication oil in the inlet opening 42, which leads to an oil discharge passage, a wall 43 is provided protruding into the pulley chamber R1 in the direction of the pulley shafts, to discharge reliably through the inlet opening 42 a large amount of lubrication oil which flows down along the wall. Therefore, it is preferable that the width of this inlet opening (i.e., the width of the inlet opening in the direction of the pulley shafts) be equal to or more than the maximum width of the V-shaped groove at the outer periphery of the driven pulley 9. In this embodiment, the inlet opening is widened to the side of the movable pulley half 9b.

The stationary pulley half 8a of the drive pulley 8 includes rectangular raised portions 52, which are provided for the measurement of the rotational speed of the drive pulley 8, and a cover 51 is provided under the drive pulley 8 in the pulley chamber R1 to cover these rectangular raised portions 52 partly. This cover 51 is, for example, press molded from a sheet metal such as a steel plate into a shape which conforms with the drive pulley 8 and the pulley chamber R1, and it is then bolted in the housing.

In this embodiment, the cover 51 is formed to cover the outer periphery of the stationary pulley half 8a, with one end 51a of the cover 51 reaching the inlet opening 41 and the other end 51b being detached from the inner wall of the pulley chamber R1. To discharge the lubrication oil from the inside of the cover to the oil pan 26, a discharge opening 51c is provided at the bottom portion of the cover 51, the bottom portion being the lowest portion of the cover 51 in the mounted condition. FIG. 1 shows the relative positions of the cover 51, the raised portions 52 of the drive pulley 8, and a rotational frequency detector 53, which detects the rotational speed of the drive pulley 8.

In this continuously variable transmission, even if the amount of the lubrication oil which flows down along the inner walls increases, and the oil accumulates at the lower portion of the pulley chamber R1, this accumulated oil is not agitated by the drive pulley 8 because of the existence of the cover 51, which constitutes an inner wall. Moreover, while the lubrication oil is being scattered by the rotation of the pulleys, part of the oil is caught into the cover 51, so the amount of the oil flowing in the cover 51 is relatively small. Furthermore, as the rotational direction of the pulleys stays in one direction (shown by an arrow in the drawing) except when the vehicle moves backward (i.e., when the rotation of the input shaft 11 is reversed by the forward-reverse selector mechanism 3), the direction of the flow of the lubrication oil in the cover 51 also stays in the same direction, and this condition makes the friction (rotational resistance) of the oil relatively small.

The end 51b of the cover 51 is located away from the inner wall of the pulley chamber R1 as shown in FIG. 1. In this construction, the lubrication oil flowing down along this part of the wall is not likely to flow into the cover 51. If the oil flew freely in this direction, which is the opposite direction to the rotational direction of the pulleys, and if the oil flowing down touched the drive pulley 8, then it would cause a substantial resistance or loss in the rotation of the drive pulley 8. However, this construction of the cover 51, which is mounted away from the wall in this direction, restricts the flow of the oil into the cover 51 in a minuscule amount, so the above mentioned resistance or loss is very small.

In this way, the lubrication oil which is used for the lubrication of the drive pulley 8, the driven pulley 9, the belt 10, etc. in the pulley chamber R1 and the hydraulic oil which is used for adjusting the widths of the pulleys are discharged through the inlet opening 41 of the discharge oil passage 76, which is located to the front of the vehicle, through the inlet opening 42 of the discharge oil passage 77, which is located to the rear of the vehicle, and through the discharge opening 44, which is at the bottom of the pulley chamber R1, leading the lubrication oil to the two sides of the oil pan 26 (i.e., close to the side toward the front of the vehicle and to the side toward the rear of the vehicle) in the horizontal direction which is perpendicular to the input and output shafts 11 and 12.

The inlet opening 41 of the discharge oil passage 76, which is provided to the front of the vehicle, and the inlet opening 42 of the discharge oil passage 77, which is provided to the rear of the vehicle, are substantially horizontal in the condition where the transmission is mounted on the vehicle. This means that the distances from both the inlet openings 41 and 42 of the oil discharge passages to the surface of the lubrication oil in the oil pan 26 are substantially equal. Therefore, the balance of the flow passages of the lubrication oil is good, and this design of the vehicular transmission is capable of maintaining a good oil level against the variation of the lubrication oil level even while the vehicle is traveling.

Figure 5:
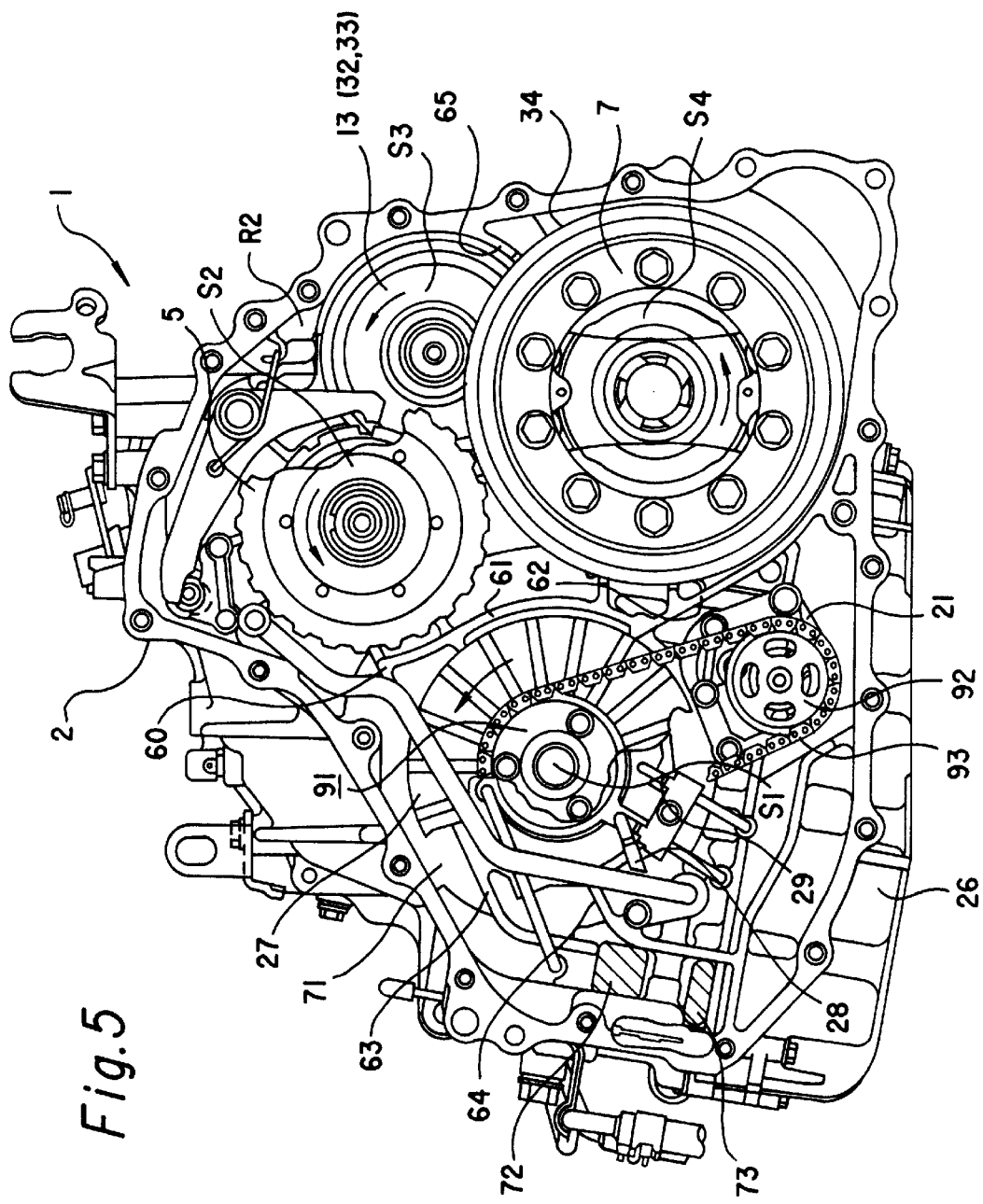
FIG. 5 is a cross-sectional view showing the inside of a second room of the vehicular transmission.
Figure 6:
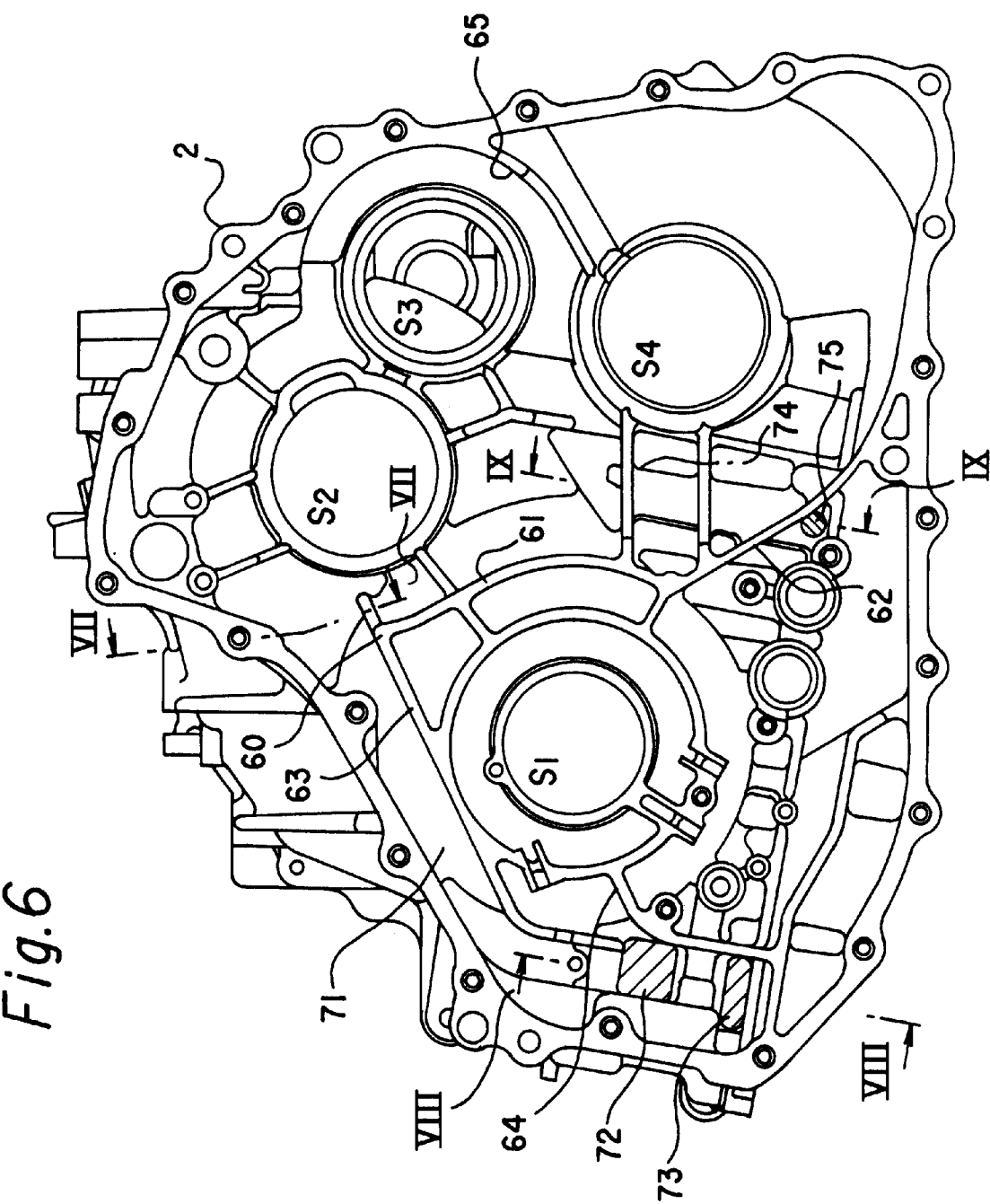
FIG. 6 is an illustration showing the construction of a wall of the second room, shown without any mechanism being installed.

FIG. 5 is a front view (a view seen in the direction indicated by arrows V—V in FIG. 11) of the second room R2 of the vehicular transmission according to the present invention. It shows the inside of the second room R2, which accommodates the starting mechanism 5, the reduction train 6, the differential mechanism 7, the oil pump 21, etc., which are shown also in FIG. 11. FIG. 6 also shows the inside of the second room R2 but without these components.

In the second room R2, the starting clutch 5 is disposed rotatably on the second shaft S2, which is located at the upper center of FIG. 5. In the driving force transmission mechanism, the starting clutch 5 is the component which requires the largest amount of lubrication oil in a forced lubrication because the frictional coupling members of the clutch generate a large amount of heat. Therefore, the oil returning from the lubrication of the clutch is also in a large amount. The first gear (secondary drive gear) 31 is disposed rotatably on the second shaft S2 behind the starting clutch 5, and an oil passage which supplies the hydraulic oil for the control of connecting and disconnecting the starting clutch 5 is provided, from the side close to the viewer in the drawing, in the center of the shaft of the stationary pulley half 9a of the driven pulley 9, which shaft constitutes the second shaft S2. In addition, another oil passage is provided, from the side distant to the viewer in the drawing, on the same shaft to supply the pilot pressure to the starting clutch 5 and the lubrication oil to the starting clutch 5, the first gear 31, the bearing portions of the second shaft S2, the second gear 32, the bearing portion of the second gear, etc. By the way, the left side of the drawing is the front side of the vehicle.

On the left side of FIG. 5, a pitot flange 27, which detects the pitot pressure generated in proportion to the rotation of the crank axle of the engine, is provided on the first shaft S1. In front of this pitot flange 27, a sprocket is provided with a chain 93, which is disposed around this sprocket and the sprocket of the oil pump 21, and the oil pump 21 is driven to generate the hydraulic pressure for lubrication and control. On the back of the pitot flange 27, pitot tubes 28 are provided with an oil supply passage 29 to supply the lubrication oil as a medium to generate the pitot pressure.

In the center of the second room R2, walls 61 and 62 are provided from a ridge 60, which is located at the upper part in the drawing, to the bottom of the outer wall of the housing to partition the pitot flange 27, the oil pump 21, the starting clutch 5, the reduction train 6 and the differential mechanism 7 to the front and to the rear of the vehicle. In addition, a wall 63 is provided from the ridge 60 leftward and downward behind the pitot flange 27, and a wall 64 is provided near the area where the pitot tubes 28 come into contact with the lubrication oil in the pitot flange 27.

In the second room R2, the lubrication oil first lubricates the starting clutch 5, the first gear 31 and the driven pulley 9 on the second shaft S2, and it is then sprayed off, by the centrifugal force generated from the rotation, from the outer periphery of the first gear 31, which is mounted on the guide portion of the starting clutch 5, in the direction perpendicular to the shaft to the inner walls which are located behind the starting clutch 5 in the drawing (also refer to FIG. 10). The sprayed oil after hitting the inner walls of the second room R2 flows down along the inner walls.

The part of the lubrication oil which sprayed from the starting clutch 5 and the first gear 31 to the top wall and the left side wall of the second room R2 is discharged through an oil passage 71 which is formed by the upper inner wall of the housing and the wall 63 extending down leftward from the top 60 of the wall 61 and through inlet openings 72 and 73 which lead to a discharge oil passage 78 located to the front of the vehicle, to the oil pan 26. FIG. 7 shows this oil passage 71 as a cross-sectional view seen in the direction indicated by arrows VII—VII in FIG. 6, and FIG. 8 shows the inlet openings 72 and 73, which lead to the discharge oil passage 78, as a cross-sectional view seen in the direction indicated by arrows VIII—VIII in FIG. 6 (also refer to FIG. 2).

On the other hand, the portion of the lubrication oil that hits the right side of the ridge 60, which is the connection of the wall 61 and the wall 63, flows down along the wall 61 and the inner wall located on the right side of the wall 61 in the drawing, and it is discharged through an inlet opening 74 of an oil discharge passage which is provided at the center of the housing in FIG. 6 to the rear of the vehicle and then to the oil pan 26. FIG. 9 shows a partial cross-sectional view (IX—IX cross section) of the inlet opening 74, which leads to the oil discharge passage 79. Furthermore, the lubrication oil which hits the top inner wall and the right side wall of the second room R2 and flows down along the right side inner wall is led by an wall 65 which is protruding into the second room R2, to the bearing portions of the fourth shaft S4 for lubrication, and it is then led by the rotation of this shaft and discharged through the inlet opening 74 of the oil discharge passage 79 to the rear part of the oil pan 26 (also refer to FIG. 2).

The lubrication oil which accumulates at the bottom of the left side chamber partitioned by the walls 61 and 62 around the first shaft S1 is scraped up by the chain 93, which is disposed around the sprocket 91 of the first shaft S1 and the sprocket 92 of the oil pump 21, and it is then sprayed to the surrounding walls by the rotation of the pitot flange 27. The portion of the lubrication oil which hits the upper wall and the left side inner wall of the second room R2 flows down along the inner wall and is discharged through the inlet openings 72 and 73 (indicated by hatching in FIG. 6) of the discharge oil passage 78 located to the front of the vehicle. The lubrication oil which hits the walls 61 and 62 flows down along the inner walls, merges with the other lubrication oil which accumulates at the bottom of the chamber and returns to the oil pan 26 through a hole 75.

The pitot flange 27 is directly coupled to the output of the engine and rotates normally in the rotational direction shown in the drawing, and the pitot tubes 28 and the oil supply passage 29, which supplies the lubrication oil used as the medium for the generation of the pitot pressure, are provided on the back of the pitot flange 27. In this condition, the lubrication oil always accumulates in the pitot flange 27 and flows out in the rotational direction through an opening which is provided on the back of the pitot flange 27. Therefore, the wall 64 is provided to lead this lubrication oil into the inlet openings of a oil discharge passage, so the oil is discharged through the inlet openings 72 and 73 of the oil discharge passage 78 to the front part of the oil pan 26. In this way, the flow of the lubrication oil is divided into the front and the rear of the vehicle by the walls 61 through 65, which are formed in a one body with the second room R2. To return this divided flow of the lubrication oil, the inlet openings of the oil discharge passages are also positioned to the front and the rear of the vehicle, respectively. Furthermore, this embodiment may be modified to comprise at least one oil discharge passage on each side of the oil pan 26 in the direction perpendicular to the input and output shafts of the continuous speed change mechanism, in the third room R3, which is located above the oil pan 26. In this case, at least one inlet opening is also provided for each oil discharge passage in the respective inner wall of the third room R3 in the same direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 10-208928 filed on Jul. 24, 1998, which is incorporated herein by reference.

What is claimed is:

1. A vehicular transmission comprising:
   a continuous speed change mechanism including a drive pulley which is disposed on an input shaft, a driven pulley which is disposed on an output shaft, and a belt which is disposed around said pulleys for torque transmission;
   a housing accommodating said continuous speed change mechanism and a driving force transmission mechanism which includes a starting mechanism;
   an oil pan which is disposed at a lower part of said housing;
   wherein:
     said housing comprises a first room which accommodates said continuous speed change mechanism and a second room which accommodates said driving force transmission mechanism, said first and second rooms being positioned above said oil pan; and
     said housing comprises at least one oil discharge passage for each side of said oil pan in a horizontal direction perpendicular to said input and output shafts, which oil discharge passage is positioned near and above said oil pan for returning hydraulic oil or lubrication oil from each of said mechanisms in said first and second rooms to said oil pan, and at least one inlet opening for each of said oil discharge passages, said inlet opening being positioned in an inner wall of each of said first and second rooms near and above each side of said oil pan in said horizontal direction.

2. The vehicular transmission as set forth in claim 1 wherein:
   said input and output shafts extend in said first and said second rooms, respectively; and
   said driving force transmission mechanism is coupled to said output shaft in said second room.

3. The vehicular transmission as set forth in claim 1 wherein:
   an inlet opening for a first oil discharge passage is provided near said drive pulley where a line extended from a straight portion of said belt meets the inner wall of said first room, to discharge the lubrication oil which departs from said belt to said oil pan; and
   an inlet opening for a second oil discharge passage is provided at a position on an upward facing inner wall of said first room, said position facing a midpoint of each width of said pulleys, to discharge the lubrication oil which flows down along this inner wall.

4. The vehicular transmission as set forth in claim 3 wherein:
   an upper end for the inlet opening of said first oil discharge passage is determined by considering factors of viscosity of the lubrication oil, rotational speed of the belt, pitch radii of the pulleys, when the pitch radius of said drive pulley is at maximum, and the pitch radius of said driven pulley is at minimum; and
   a lower end is determined by considering said same factors while these pitch radii are changed to opposite extremes, respectively.

5. The vehicular transmission as set forth in claim 3 wherein a width, in said pulleys' axial direction, for the inlet opening of said first oil discharge passage is set substantially equal to a maximum width of a V-shaped groove of said drive pulley at an outer periphery thereof.

6. The vehicular transmission as set forth in claim 3 wherein:
   a wall is provided at a downstream end in a direction of lubrication oil flow, of the inlet opening of said second oil discharge passage, said wall protruding into said first room and extending in the axial direction; and
   a width, in the axial direction, for the inlet opening of said second oil discharge passage is set equal to or more than the maximum width of the V-shaped groove of said driven pulley at the outer periphery thereof.

7. The vehicular transmission as set forth in claim 1 wherein a cover is provided near the outer periphery of a lower portion of said drive pulley to cover rectangular raised portions that are provided on said drive pulley for detection of rotational speed thereof.

8. The vehicular transmission as set forth in claim 7 wherein:
   one end of said cover extends to an end of the inlet opening of said first oil discharge passage, and another end of said cover extends away from the inner wall of said first room; and
   said cover in a mounted condition includes a discharge opening at a bottom portion thereof.

9. The vehicular transmission as set forth in claim 3 wherein the inlet openings of said first and second oil discharge passages are positioned substantially horizontal when the transmission is mounted on a vehicle.

* * * * *